US009015198B2

(12) United States Patent
Osmond

(10) Patent No.: US 9,015,198 B2
(45) Date of Patent: Apr. 21, 2015

(54) METHOD AND APPARATUS FOR LARGE SCALE DATA STORAGE

(75) Inventor: Roger Frederick Osmond, Littleton, MA (US)

(73) Assignee: Pi-Coral, Inc., San Jose, CA (US)

( * ) Notice: Subject to any disclaimer, the term of this patent is extended or adjusted under 35 U.S.C. 154(b) by 247 days.

(21) Appl. No.: 12/785,993

(22) Filed: May 24, 2010

(65) Prior Publication Data

US 2010/0306269 A1    Dec. 2, 2010

Related U.S. Application Data

(60) Provisional application No. 61/180,996, filed on May 26, 2009.

(51) Int. Cl.
*G06F 17/30* (2006.01)
*G06F 13/00* (2006.01)
(Continued)

(52) U.S. Cl.
CPC .... *G06F 17/30067* (2013.01); *G06F 17/30182* (2013.01); *G06F 17/30073* (2013.01); *G06F 17/30091* (2013.01); *G06F 17/30194* (2013.01)

(58) Field of Classification Search
CPC ......... G06F 17/30; G06F 13/00; G06F 15/16; G06F 9/455
USPC ......... 707/609, 637–640, 692–700, 790–793, 707/821–825, 827–831, 813, 783–788; 711/4, 105, 111, 113–114, 208–209, 711/162–163, 165, 112; 709/203, 206; 718/1

See application file for complete search history.

(56) References Cited

U.S. PATENT DOCUMENTS 5,361,349 A * 11/1994 Sugita et al. ............... 1/1
5,386,525 A *  1/1995 Noack ....................... 1/1
6,052,697 A    4/2000 Bennett et al.
(Continued)

FOREIGN PATENT DOCUMENTS

WO  WO 2007/011164  *  1/2007
WO  WO 2013/030864  *  3/2013

OTHER PUBLICATIONS

Arrian Mehis et al. "Designing and Optimizing Dell/EMC SAN Configurations Part 1",Power Solutions, Jun. 2004, pp. 94-98.*
(Continued)

*Primary Examiner* — Srirama Channavajjala
(74) *Attorney, Agent, or Firm* — Pepper Hamilton LLP

(57) ABSTRACT

A logical apparatus and associated methods provide highly scalable and flexible data storage in a network of computers. The apparatus provides flexible organizational and access control mechanisms and a practical and efficient way to work with smaller portions of a data storage system at a given time to enable sparse population, caching, paging and related functions. A data structure, called a virtual container, comprises references to objects stored in a data storage system such that the same object can be visible from different virtual containers, if such virtual containers hold references to said object. Access controls further enhance the effectiveness of the methods and structures to enable multiple simultaneous organizational schemes and selective sharing of objects. Participating nodes provide access to objects stored on said nodes and their participating peer nodes, employing the data storage apparatus, such that balance in the network is achieved by data placement decisions that may combine common constraints and a node's individual self interest.

20 Claims, 12 Drawing Sheets

(51) Int. Cl.
*G06F 15/16* (2006.01)
*G06F 9/455* (2006.01)

(56) References Cited

U.S. PATENT DOCUMENTS

| | | | |
|---|---|---|---|
| 6,578,036 | B1 | 6/2003 | Lu et al. |
| 6,625,592 | B1 | 9/2003 | Dyer et al. |
| 6,735,623 | B1* | 5/2004 | Prust .............................. 709/219 |
| 6,938,059 | B2* | 8/2005 | Tamer et al. ........................... 1/1 |
| 7,035,910 | B1 | 4/2006 | Dutta et al. |
| 7,043,494 | B1 | 5/2006 | Joshi et al. |
| 7,552,279 | B1* | 6/2009 | Gandler ........................ 711/114 |
| 7,757,210 | B1 | 7/2010 | Krueger |
| 8,176,319 | B2* | 5/2012 | Osmond et al. ............... 713/165 |
| 8,185,751 | B2* | 5/2012 | Osmond et al. ............... 713/193 |
| 8,583,861 | B1* | 11/2013 | Ofer et al. ..................... 711/112 |
| 2001/0049671 | A1 | 12/2001 | Joerg |
| 2002/0019908 | A1* | 2/2002 | Reuter et al. .................. 711/112 |
| 2002/0091872 | A1 | 7/2002 | Bourke-Dunphy et al. |
| 2003/0093496 | A1 | 5/2003 | O'Connor et al. |
| 2003/0149751 | A1 | 8/2003 | Bellinger et al. |
| 2003/0200295 | A1 | 10/2003 | Roberts et al. |
| 2004/0030822 | A1* | 2/2004 | Rajan et al. ........................ 711/4 |
| 2004/0078353 | A1* | 4/2004 | Brock et al. ....................... 707/1 |
| 2004/0148588 | A1 | 7/2004 | Sadiq |
| 2004/0205101 | A1 | 10/2004 | Radhakrishnan |
| 2004/0215729 | A1 | 10/2004 | Kuwata et al. |
| 2005/0195660 | A1* | 9/2005 | Kavuri et al. ............ 365/189.05 |
| 2005/0198330 | A1 | 9/2005 | Kawabata et al. |
| 2005/0235132 | A1* | 10/2005 | Karr et al. ..................... 711/203 |
| 2005/0278348 | A1 | 12/2005 | Falter et al. |
| 2006/0047930 | A1* | 3/2006 | Takahashi et al. ............ 711/162 |
| 2006/0059173 | A1 | 3/2006 | Hirsch et al. |
| 2006/0218369 | A1* | 9/2006 | Fujino .......................... 711/170 |
| 2006/0248200 | A1* | 11/2006 | Stanev .......................... 709/227 |
| 2006/0294126 | A1 | 12/2006 | Ganjoo |
| 2007/0143859 | A1 | 6/2007 | Ogi et al. |
| 2007/0276765 | A1 | 11/2007 | Hazel et al. |
| 2007/0294215 | A1 | 12/2007 | Boss et al. |
| 2008/0065639 | A1 | 3/2008 | Choudhary et al. |
| 2008/0127354 | A1 | 5/2008 | Carpenter et al. |
| 2008/0147787 | A1 | 6/2008 | Wilkinson et al. |
| 2008/0147960 | A1* | 6/2008 | Sugino et al. ................. 711/100 |
| 2009/0106766 | A1* | 4/2009 | Masuda ........................ 718/104 |
| 2009/0119298 | A1 | 5/2009 | Faitelson et al. |
| 2009/0228514 | A1 | 9/2009 | Liu et al. |
| 2009/0240823 | A1 | 9/2009 | Rider et al. |
| 2009/0271412 | A1* | 10/2009 | Lacapra et al. .................. 707/10 |
| 2010/0153947 | A1* | 6/2010 | Haruma ........................... 718/1 |
| 2010/0299333 | A1 | 11/2010 | Osmond |
| 2010/0299362 | A1 | 11/2010 | Osmond |
| 2011/0055536 | A1* | 3/2011 | Banga et al. ..................... 713/2 |
| 2012/0036252 | A1 | 2/2012 | Shi et al. |
| 2012/0060171 | A1 | 3/2012 | Bobroff et al. |
| 2012/0079188 | A1* | 3/2012 | Hayashi ....................... 711/114 |
| 2012/0102050 | A1 | 4/2012 | Button et al. |
| 2013/0031549 | A1 | 1/2013 | Osmond |

OTHER PUBLICATIONS

Nitin Muppalaneni et all., "A Multi-tier RAID Storage System with RAID1 and RAID5", IEEE 2000, 1-9 pages.*

Baiocchi, Giovanni, Using Perl for Statistics, Data Processing and Statistical Computing, Journal of Statistical Software, May 2004, vol. 11, Issue 1.

Broder, et al., Using Multiple Hash Functions to Improve IP Lookups, IEEE Infocom 2001.

Benford, The Law of Anomalous Numbers, Mar. 1938, Proc. Amer. Phil. Soc. 78:(4)551-572.

Chen, Multiple-Watermarking Scheme of the European Article Number Barcode Using Similar Code Division Multiple Access Technique, 2008 Applied Mathematics and Computation 197:243-261.

* cited by examiner

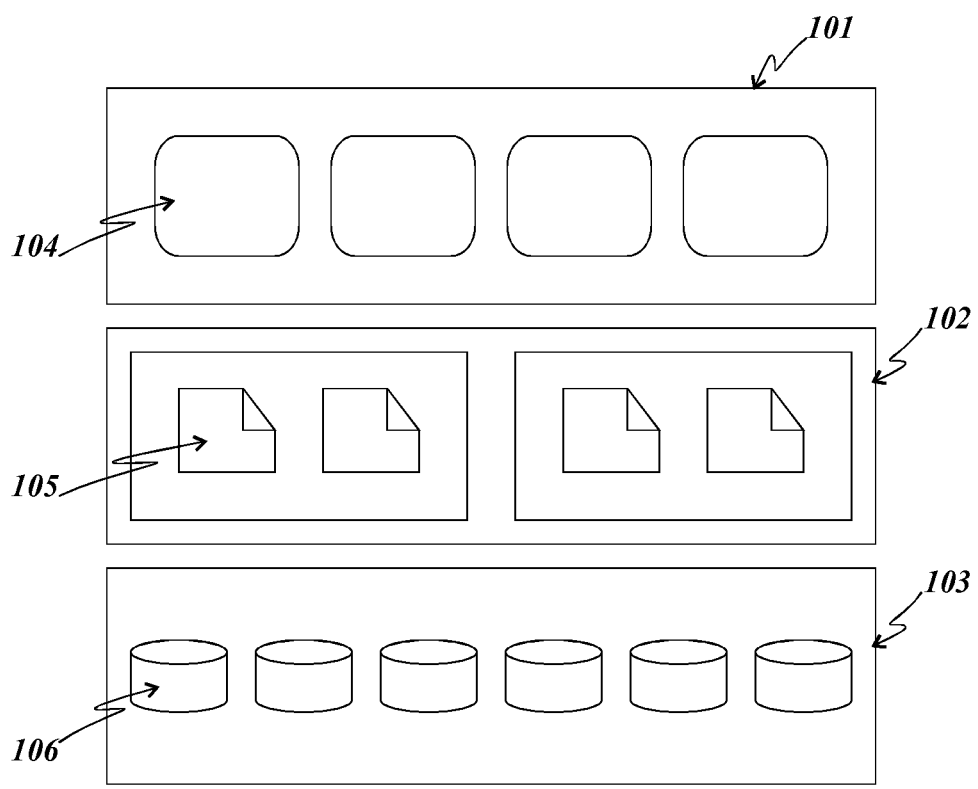
*FIG. 1 - Virtual, Logical and Physical Storage Layers*

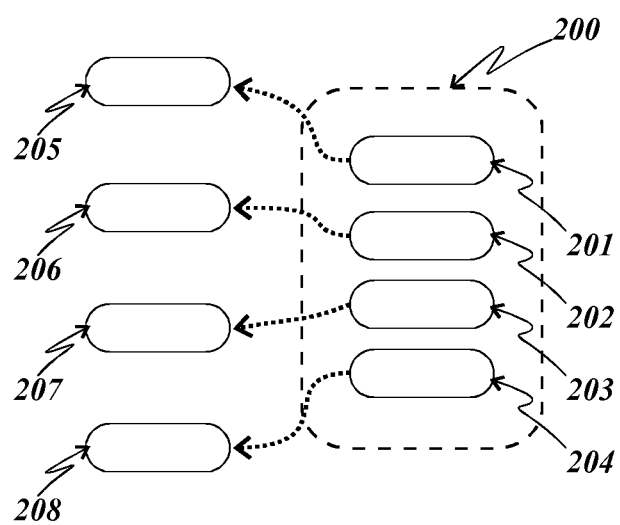
**FIG. 2 - *Virtual Container and Reference Objects***

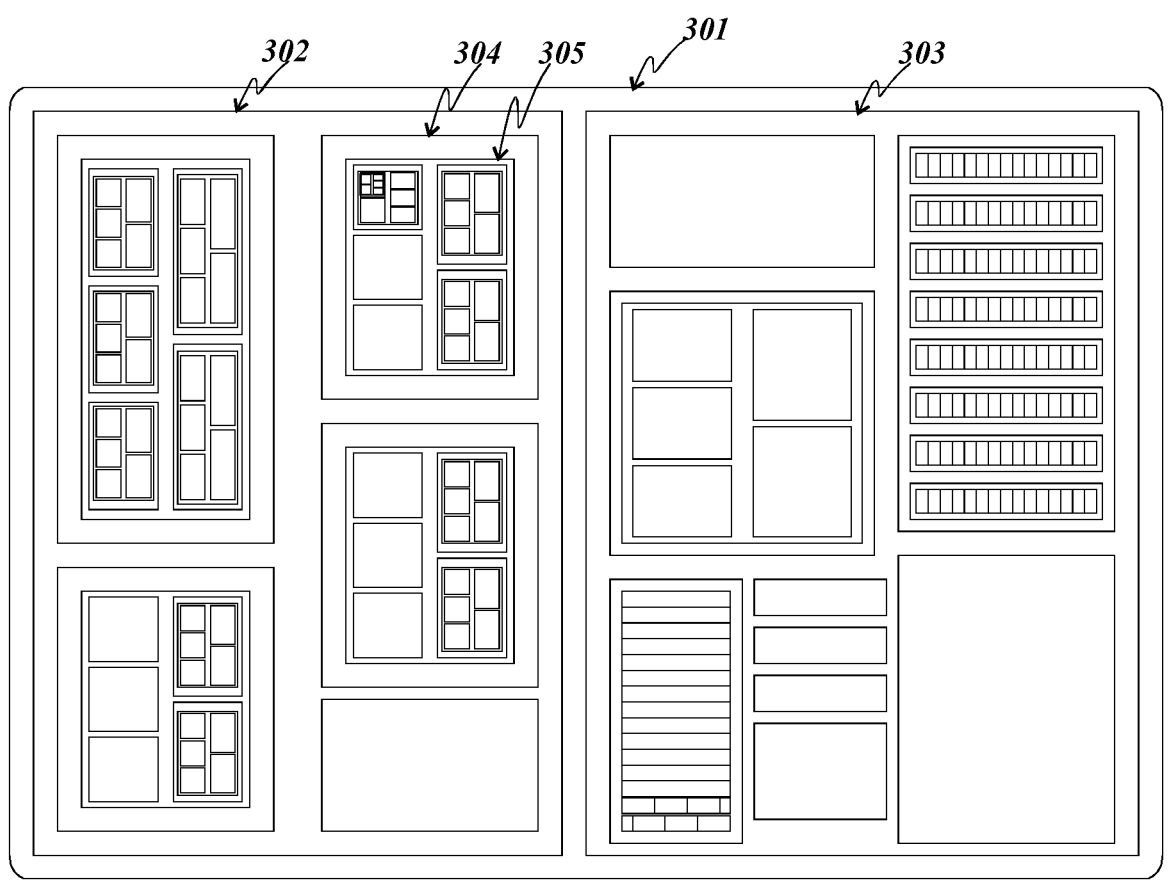
*FIG. 3 - A Nested Virtual Container Configuration*

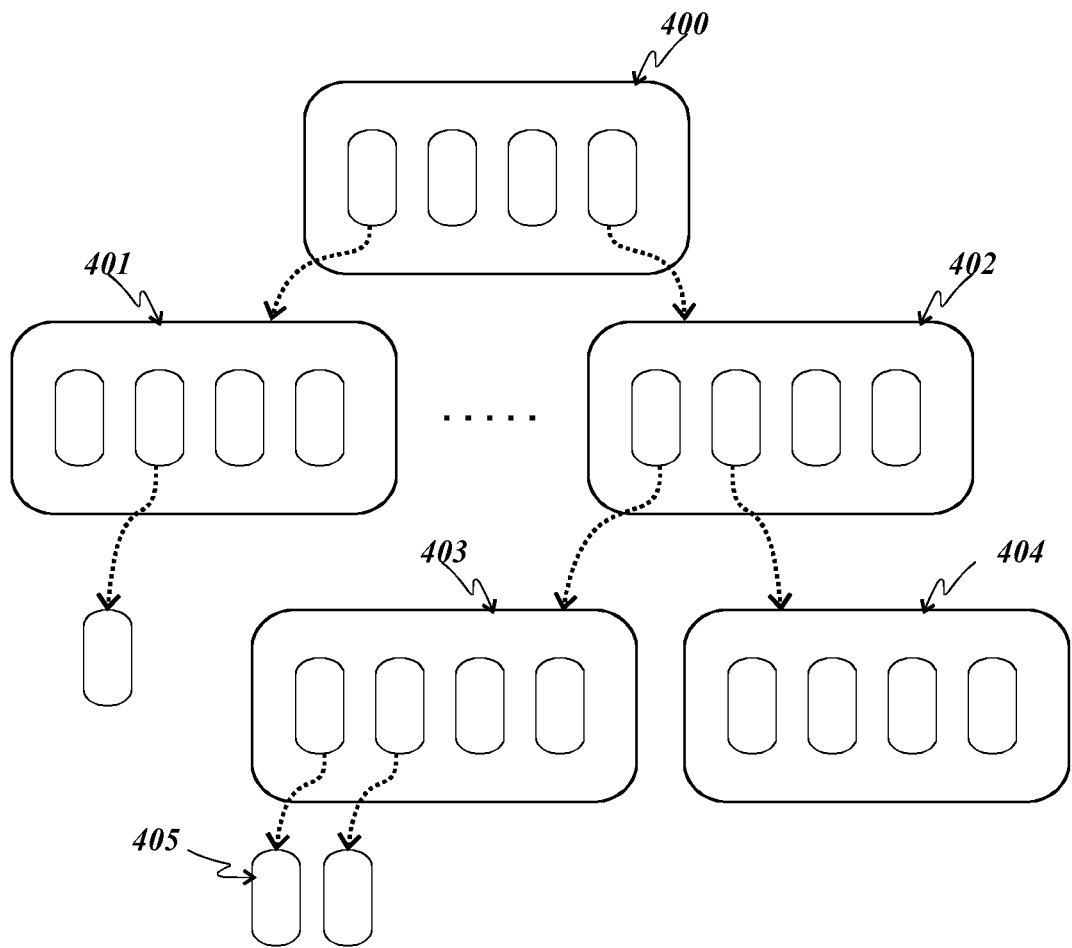
*FIG. 4 - A Top-Level Virtual Container
with References to Subordinate Virtual Containers*

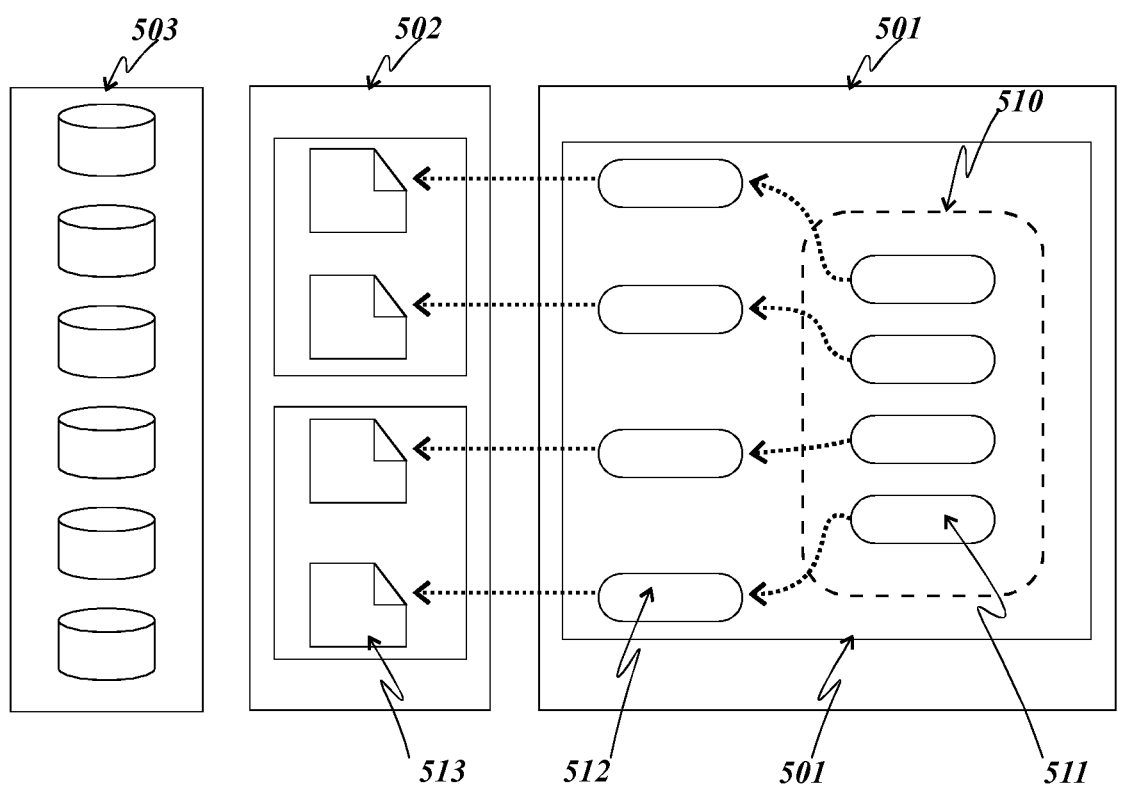
*FIG 5 - A Virtual Container Representing an Owner Space*

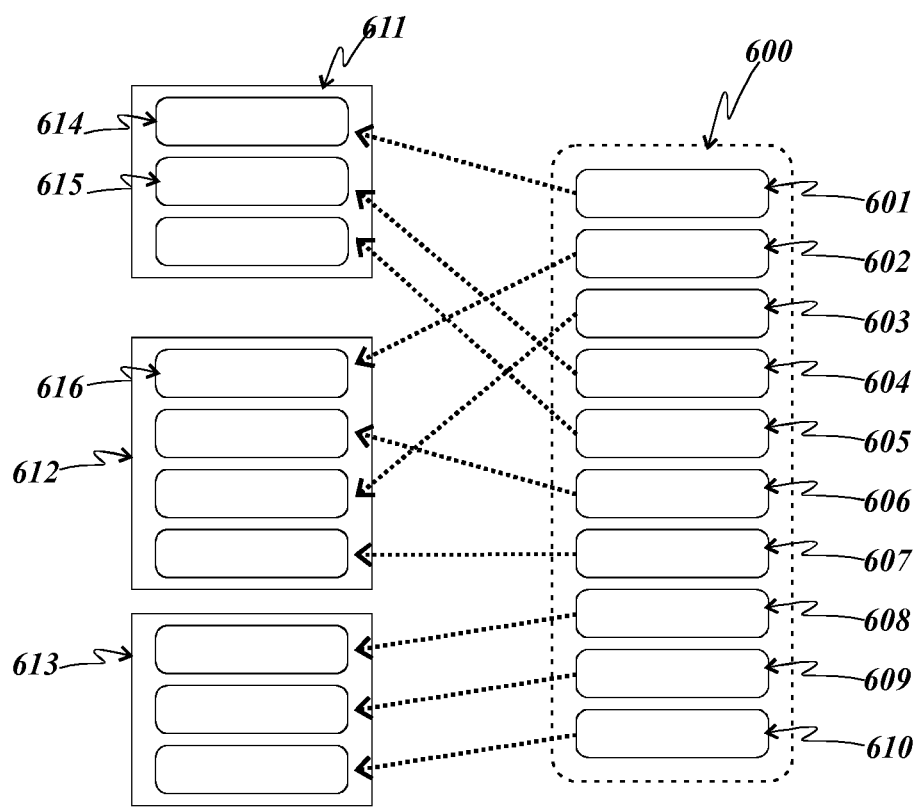
FIG. 6 - A Virtual Container Representing A Single Large Object

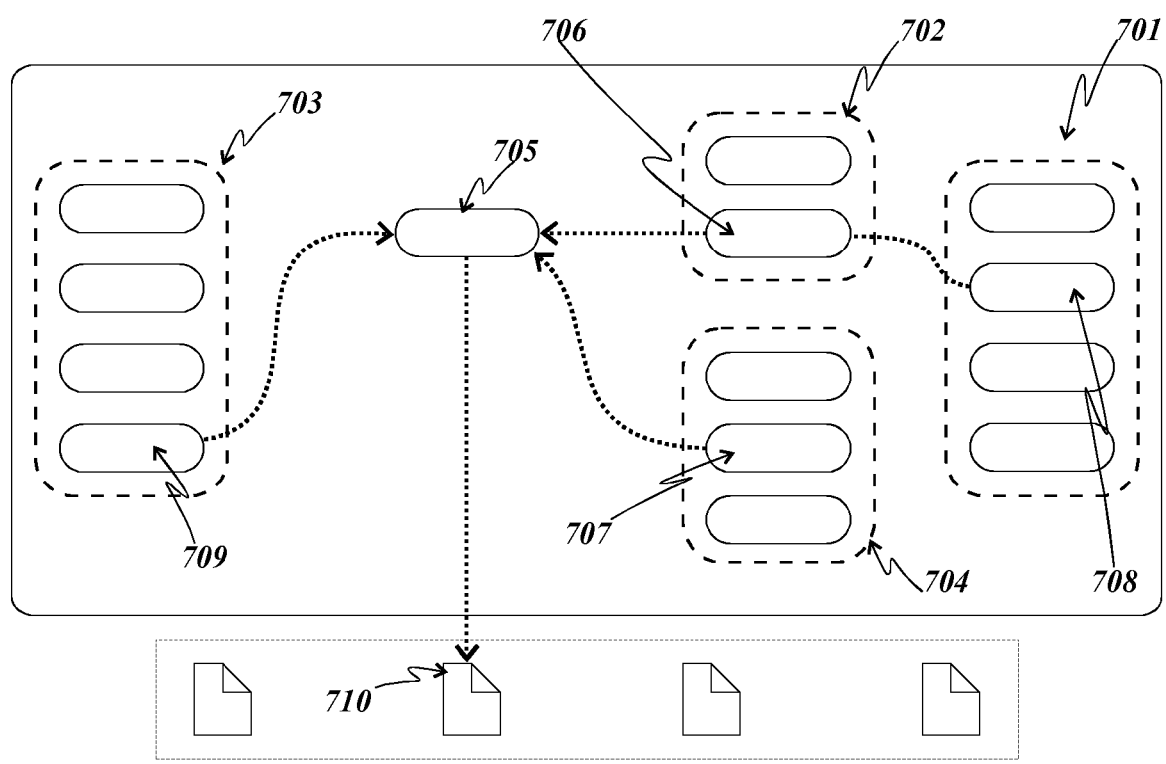
*FIG. 7 - Multiple References to a Single Stored Object*

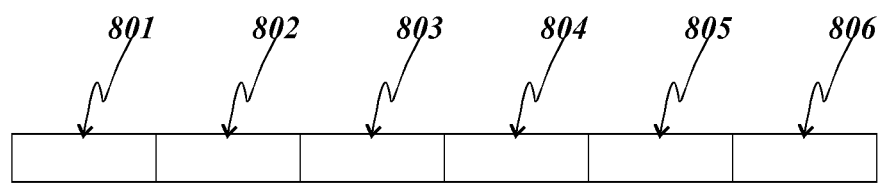
*FIG. 8 - A Possible Access Policy Encoding*

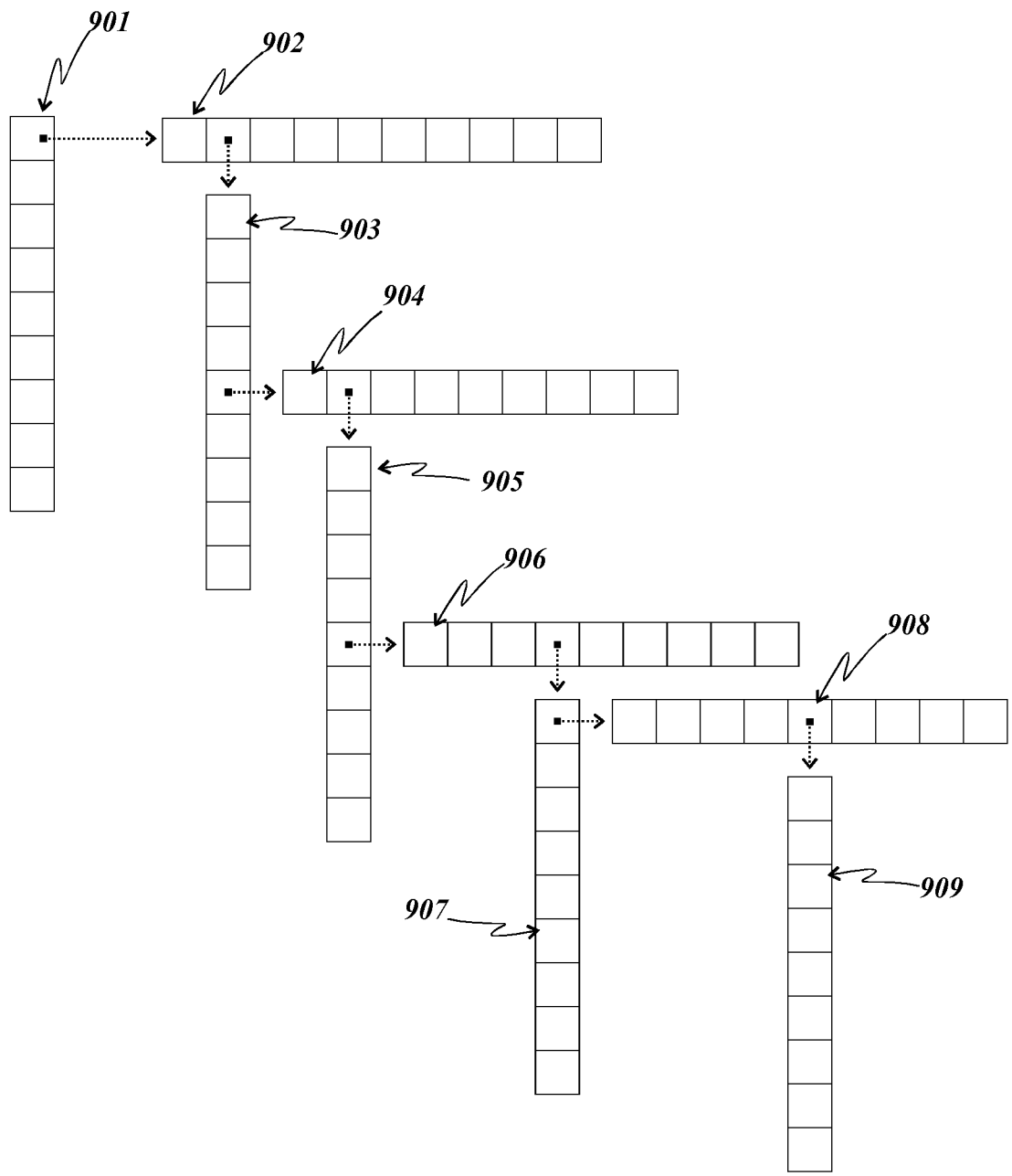
*FIG. 9 - A Nested Indexable Structure*

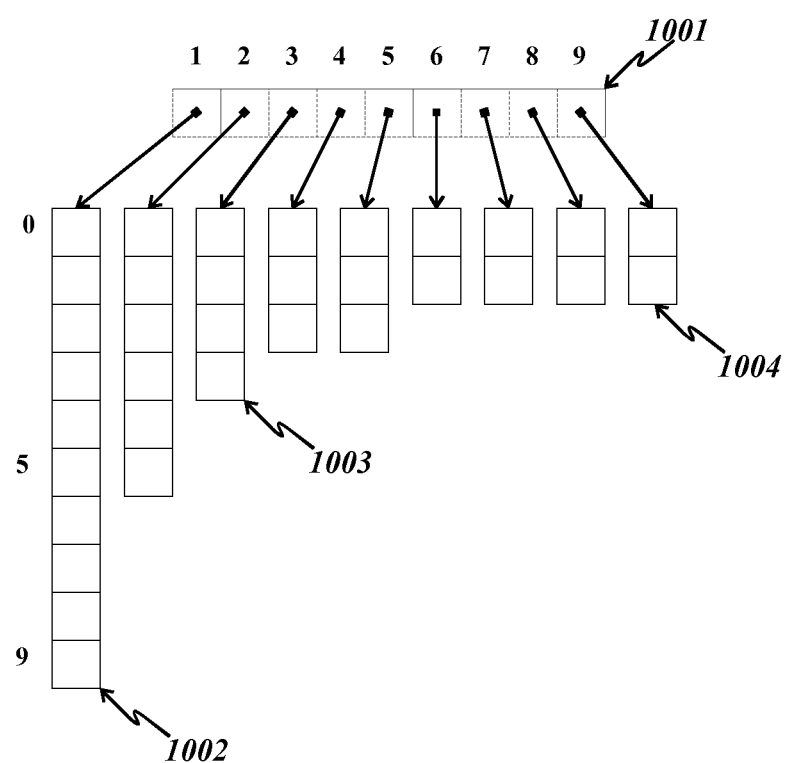
FIG. 10 - *A Top-Level Virtual Container with 34 Item Nominal Capacity*

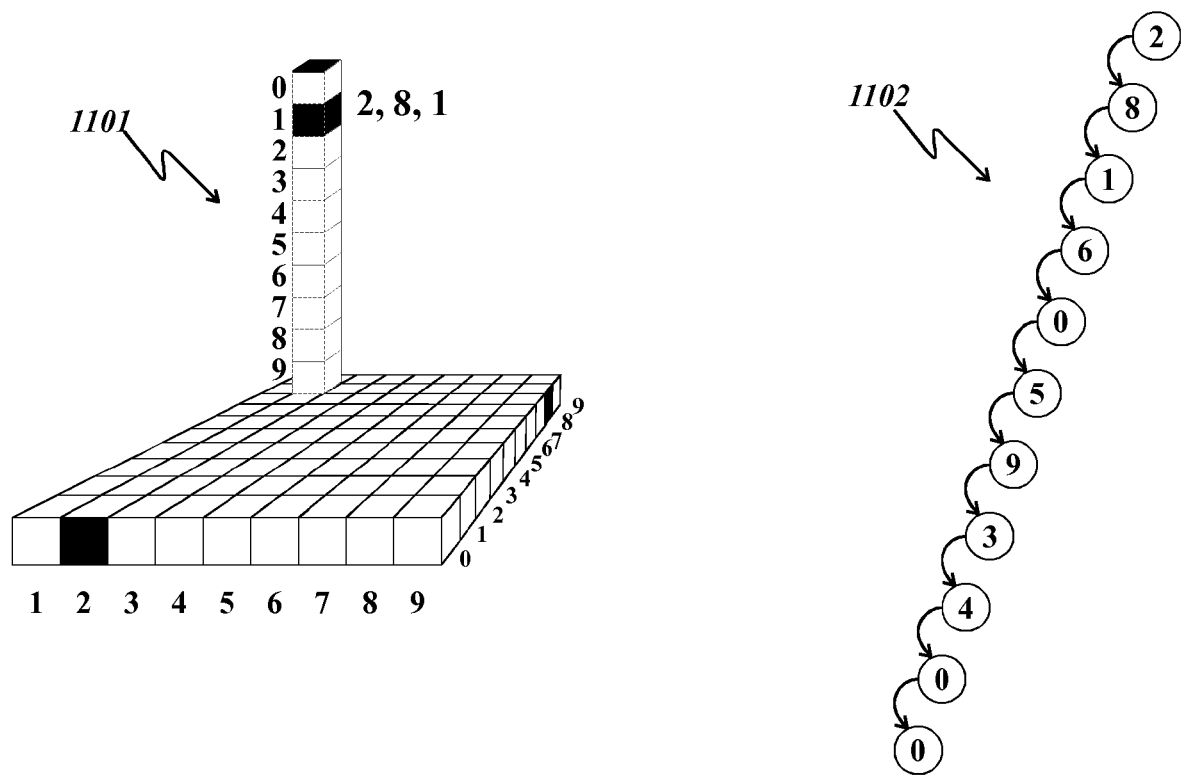
FIG. 11 - Sequence of Digits in Hash Code 28160593400

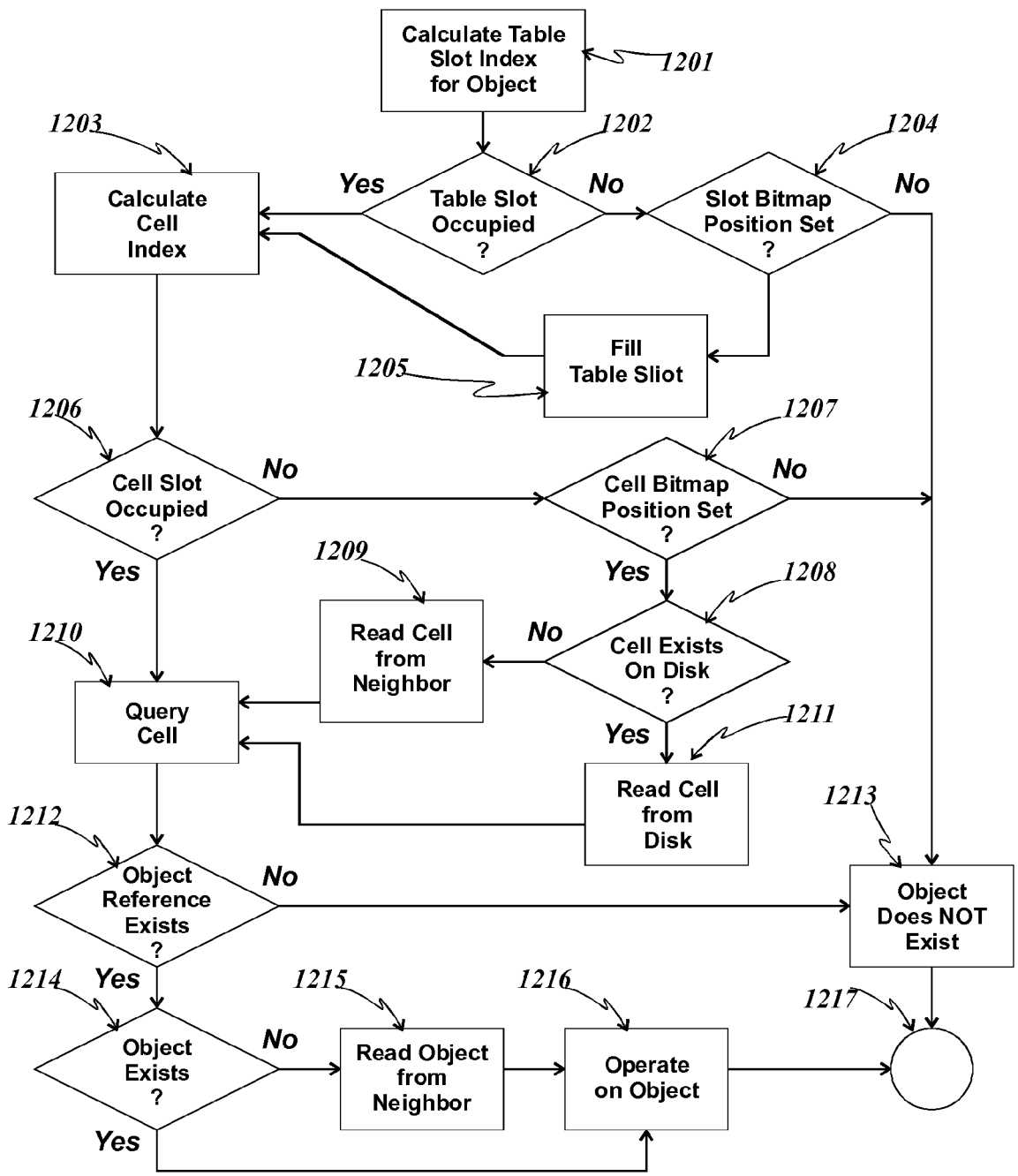
*FIG. 12 - Progressive Metadata Logic Flow*

METHOD AND APPARATUS FOR LARGE SCALE DATA STORAGE

This invention claims priority to U.S. Provisional Patent Application No. 61/180,996 entitled "Method and apparatus for large scale data storage" filed May 26, 2009.

CROSS-REFERENCE TO RELATED APPLICATIONS

The method described in the present application is based on and incorporates in its entirety co-pending U.S. Patent Application Publication No. 2010/0299333 entitled "Method for improving the effectiveness of hash-based data structures", by Roger F. Osmond, filed on May 13, 2010, and co-pending U.S. Patent Application Publication No. 2010/0299362 entitled "Method for controlling access to data containers in a computer system", by Roger F. Osmond, filed on May 24, 2010.

BACKGROUND OF THE INVENTION

The present invention relates generally to computer software and computer based data storage. Aspects of this invention also relate particularly to the challenges associated with very large scale data storage systems and networks.

Current data storage systems fall into three major categories: file systems, data bases and content-address storage (CAS). Structured data resides in data bases, but the preponderance of the world's unstructured and semi-structured data resides in some form of file system. Common file systems include NTFS from Microsoft, ufs, ffs and ext3 in the UNIX and Linux arena, and ZFS from Sun Microsystems.

File systems are hierarchical data structures typically constructed from indexable tables. The hierarchical construction of file systems supports a single organizational model which, although useful in many contexts, is by its nature limited and limiting.

The indexable table construction imposes limitations as well. File systems are limited in scale based on the sizes of various tables. File system construction is such that each object (file or directory) must be uniquely addressable by an integer index called an inode (for index node). The number of objects in a file system is limited by the size of integers used.

File systems are also limited with respect to the total capacity in bytes, also by relatively simple arithmetic. A block on disk is typically 512 bytes. If each inode were to address 512 bytes, the total byte capacity of a file system would be 512*(2.0E31) or about 1 Terabyte (TB). Because file systems have their own blocking layer above the disk layer, the actual limits for many file systems are larger—commonly 16 TB and often a little more.

Individual files in modern file systems are also limited by the index arithmetic, and per-file limits are commonly 2 TB or less. While 2 TB is a very large file in most contexts, there are applications that require or would benefit from larger single objects.

A relatively new file system, ZFS from Sun Microsystems, claims very large capacities by using 128 bits for sizing many of its structures. While the theoretical scale is indeed very large, there are still issues with this approach because it is still a file system. For example, there is still only one organizational model, and the file system is not specifically designed for distribution or sparse population, further limiting its practical scale.

Additional factors affect the ability of storage systems (not just file systems) to scale practically. Even with advances in processor and memory technology, there is a limit to the amount of main memory that a computer can have. Even in a very well provisioned computer, the main memory must be available for more than one operation at a time.

It would be advantageous for a data storage solution to support sparse population of main memory and of local disk storage such that a computer of typical resource level could reasonably access and serve data to its clients.

File systems are structure-oriented in that their primary organizational factor is structure. Because of this, file systems commingle objects from different owners and in turn must provide a means by which to manage ownership and permissions on a per-object basis. It would be advantageous for a data storage solution to provide more flexible organization options, while simplifying access control by eliminating commingling.

Objects in file systems are for the most part files and directories. This model works well in many contexts, and most applications today assume this model, the exception being applications specifically designed for databases, CAS (Content-Addressed Storage) systems and web-based data. The file model does not however apply well to multimedia content. By definition, multimedia content is content with data that applies to or is consumed by more than one medium. One example is video with sound. There are encodings available to store audio and video information in a single file, but as the content becomes richer, with variable or optional components, the single encoded file approach fails. It would be advantageous for a data storage solution to provide support for complex multimedia content in a way that makes it simple to ingest, manage and consume.

BRIEF SUMMARY OF THE INVENTION

The present invention comprises construction, organization and access control methods to provide a highly scalable and flexible data storage system well suited but not limited to multimedia objects. Additionally, the present invention includes methods to support sparse data structure population and caching or paging to conserve computer system resources and to support larger scale data sets.

LIST OF TABLES

Table 1 lists the predicted distribution of leading digits, per Benford's Law.
Table 2 lists digit distributions in smaller sub-slots.
Table 3 shows the slot allocation for 1531 total slots in the top layer.
Table 4 shows, for the preferred embodiment, the widths (total slots) of each layer.

BRIEF DESCRIPTION OF THE SEVERAL VIEWS OF THE DRAWING

The present invention may be better understood by referring to the following description taken in conjunction with the accompanying drawings in which:

FIG. 1 depicts virtual, logical and physical storage layers,
FIG. 2 depicts a virtual container and reference mechanism, showing a simple virtual container, the reference objects it contains, and the references to other objects outside of the container,
FIG. 3 depicts a possible nested virtual container configuration,
FIG. 4 depicts a top-level virtual container holding references to subordinate virtual containers, FIG. 5 depicts a virtual container representing an owner space and a virtual container nested within it, along with contained references to objects stored at the logical and physical layers, FIG. 6 depicts a possible use of a virtual container to represent a large multimedia object while implementing storage of that object as a collection of slices, FIG. 7 depicts a single stored object being referenced by reference objects in multiple virtual containers, FIG. 8 depicts a possible encoding of a virtual container's access policy, FIG. 9 depicts a nest of indexable structures 9 layers deep, FIG. 10 depicts the configuration of top-level virtual container with a 34 item nominal capacity, FIG. 11 depicts the path-like effect of using digits from a hash code, and FIG. 12 depicts a simplified flow of logic for a method of progressively obtaining and acting upon object data and metadata.

DETAILED DESCRIPTION OF THE INVENTION

In accordance with the present invention, a scalable data storage system provides very high object, collection and total storage capacities. It also provides flexible organizational and access control mechanisms. In accordance with the present invention, a scalable data storage system also provides a practical and efficient way to work with smaller portions of the data storage system at a given time to enable sparse population, caching, paging and related functions.

The present invention comprises software components called virtual containers. Virtual containers exist in a virtual storage layer as depicted by Item 101 in FIG. 1. Item 104 represents a virtual container in a virtual storage layer. Item 102 represents a logical storage layer, with Item 105 representing a stored object at that layer. Item 103 represents a physical storage layer, with Item 106 representing physical storage layer objects (e.g. disks or LUNs). In accordance with the present invention, virtual containers do not hold actual data objects in the traditional sense such as files in a file system. Instead, virtual containers hold reference objects. Reference objects are references to other objects, including data objects, other reference objects, and other virtual containers. FIG. 2 depicts a virtual container (Item 200) comprising 4 reference objects (Items 201 through 204) and 4 other objects (Items 205 through 208) to which the reference objects refer. It is important to note that objects to which reference objects refer can reside in separate virtual containers.

Because virtual containers hold only reference objects, their implementation is not physically nested in that one virtual container does not physically contain another. One virtual container can hold a reference object that refers to another virtual container. In practice, a system is constructed using virtual containers such that the structure of the system appears to be built of nested virtual containers. This appearance arises from the characteristic of reference objects that makes them appear to be the objects to which they refer. FIG. 3 depicts a possible nesting structure that, while not implemented physically in this manner, appears as such to any client components or other entities. In FIG. 3, an outermost virtual container, Item 301, holds 2 other virtual containers (Items 302 and 303). A virtual container represented by Item 302 holds another virtual container (Item 304) which in turn holds another virtual container (Item 305) and so forth.

Virtual containers can be configured in such a way as to organize a data storage system as a hierarchy and thereby resembling a traditional file system, but any number of other configurations is also possible.

In one embodiment of the present invention, the data storage system itself is implemented as a large virtual container. The data storage system would appear to hold any number of subordinate virtual containers. In one possible configuration, the subordinate virtual containers would be assigned to individual owners and called owner spaces. Each owner would be able to add objects directly to his respective owner space virtual containers, and would be able to create additional virtual containers within his respective owner space as desired. Item 400 in FIG. 4 represents a top layer virtual container (the data storage system in this embodiment). Item 400 holds reference objects that refer at least to Items 401 and 402. Item 402 holds reference objects that refer at least to Items 403 and 404. Item 403 holds reference objects that refer at least to Item 405.

Separation of virtual and logical storage layers enables the configuration to exist on one or many file systems thereby avoiding the limitations of a single file system.

In the preferred embodiment of the present invention, virtual containers exist in a virtual layer above a more conventional logical layer comprising one or more conventional file systems. Individual data objects, called stored objects, would reside in the file systems in the logical layer. Reference objects in the owner's spaces would refer to the stored objects. FIG. 5 depicts an example of this relationship. In FIG. 5, Item 501 represents a virtual storage layer; Item 502 represents a logical storage layer and Item 503 represents a physical storage layer. Item 510 represents a virtual container comprising 4 reference objects. Item 511 represents a reference object that refers to another reference object (Item 512) which in turn refers to a stored object in a logical layer. Objects in a logical storage layer are stored conventionally in volumes on disk in a physical storage layer.

By creating a level of indirection between an apparent data object (actually a reference object) and an actual stored object, the data storage system gains considerable flexibility with respect to configuration and scale. A given container can, for example hold references to objects stored in multiple file systems.

The indirect nature of reference objects, combined with the ability for object references to refer to other virtual containers, makes it possible to present large data objects (e.g. audio, video and multimedia objects) as apparently atomic, but implement their storage as virtual containers of slices of that whole object. For example, a 100 Gigabyte (GB) object could be sliced into 10 pieces of 10 GB each, and each slice stored as an individual stored object. Clients referring to the original object would use a single identifier (e.g. a Universal Resource Identifier or URI) and would be unaware of the actual storage implementation.

Item 600 in FIG. 6 depicts a virtual container that might represent a large multimedia object like the one just discussed. Item 600 holds 10 reference objects, represented by Items 601 through 610, each referring to other objects. The objects to which the reference objects in Item 600 refer reside in 3 separate logical storage elements (Items 611, 612 and 613). The characteristics of reference objects and virtual containers is such that adjacent reference objects (e.g. Items 601 and 602) need not be stored adjacently in a logical storage layer, or even in the same logical storage entity. Such details are not revealed at the virtual storage layer. Clients of a multimedia object represented by Item 600 need not be aware that the object might be subdivided, as the client interface to the multimedia object does not change, regardless of the storage implementation.

The mechanism of virtual containers and reference objects can be exploited to provide additional valuable capabilities, including but not limited to representing multiple forms of an object by a single identifier. For example, if a movie object comprises a core video component (itself possibly in multiple encodings for different display terminal types), multiple audio tracks, multiple subtitle tracks and popular extras like behind-the-scenes footage and the like, then it would be possible to present that movie object, by a single URI, in any one of its multiple different languages, with or without subtitles, in a format suitable to a display terminal device, depending on the context in which it was being served by a data storage system.

Similarly, said mechanism could support collections of dissimilar but closely related objects of different forms (e.g. text files, audio files, professionally and/or user-produced videos, or application-specific data). A virtual container would have a single URI, but each component could be accessible as a component of that virtual container, if desired.

Because virtual containers hold only object references and not actual data objects, the reference objects in one virtual container might refer to the same object as do reference objects in one or more other virtual containers. This provides a high degree of organizational flexibility and contrasts significantly with the rigid structure of file systems. Item 710 in FIG. 7 represents a stored object. In accordance with the present invention, only the reference object represented by Item 705 refers directly to the stored object represented by Item 710. Items 706, 707 and 709 refer directly to the reference object represented by Item 705. Item 708 refers to Item 706 and so refers to Item 705 indirectly. Because each reference object is only a reference and not the data in the object, there need not be any duplication of the data within the stored object when adding references to multiple virtual containers. Also, by enforcing that the stored object have exactly one reference object referring to it directly, and that the one reference object reside in the owner space virtual container, accidental removal of the stored object by way of an indirect reference object in a subordinate container is prevented. The stored object is removed if and only if the single direct reference to it, in the owner space container, is removed.

It is advantageous to be able to refer to the same object from more than one perspective, and a wide range of applications that can exploit this capability is possible. One example is organizing documents and work products in a legal firm. Virtual containers could act as binders to hold all data objects associated with a case, or a client, or an attorney (e.g. affidavits, contracts, video and/or audio testimony and depositions, attorney notes, applications and supporting material). The same objects could exist in each of several binders while retaining a single authoritative copy at all times (the stored object). Another application might be photo organizing. In such an application, it would be possible to create different albums for multiple possibly orthogonal topics, adding references to the actual stored photo objects to each album to which the photo relates (e.g. "vacations", "sunsets", and "friends").

In the preferred embodiment, reference objects could have multiple subtypes including a managed reference (where the integrity of the reference is assured) and unmanaged or external references (references to objects outside of the current space or storage system). One subtype of reference object could be as simple as an Internet hyperlink (a URI that identifies another object on the Internet). A virtual container can hold any manner of reference object.

In contrast with the per-file ownership and permission methods used by file systems, access control is asserted on a per-container basis in accordance with the method described in U.S. Patent Application Publication No. 2010/0299362.

In the preferred embodiment, as noted earlier, there might be a configuration in which the top-level virtual container is the storage system itself, and at a subordinate layer, whole virtual containers would belong to individual owners, making each such virtual container an owner space. Because all objects stored within an owner space belong to the owner of the space, the need for per-object ownership is obviated. Instead, ownership is implied by possession. This makes possible a more flexible access control capability.

Access to virtual containers is controlled by per-container access policy and optional additional rules. The preferred embodiment of U.S. Patent Application Publication No. 2010/0299362 applied to the present invention includes 6 access conditions for each virtual container, where the access modes associated with the access conditions are: read, list, create, update, delete and manage. Access modes are characterized as follows.

Read mode for a container permits a user to see a data object by way of a reference object within that container, assuming that the reference resolves to a readable stored object. Read permission does not imply list permission.

List mode for a container permits a user to see (i.e. list) the reference objects in that container. List permission does not imply read permission.

Create mode for a container permits a user to add new objects to the container. Create permission does not imply update permission.

Update mode for a container permits a user to replace an existing object in that container, by way of its reference object.

Delete mode for a container permits a user to delete an object from that container.

Manage mode for a container permits a user to manage the other access modes.

An access condition is a tuple of an access mode and an access group. An access group is a collection of user identifiers and/or access group identifiers to whom access rights are granted. The members of an access group associated with an access mode by means of an access condition are granted the access rights associated with that access mode.

In accordance with the preferred embodiment of U.S. Patent Application Publication No. 2010/0299362, there are 2 predefined and immutable access groups, called Public and Private. The Public access group includes by definition every possible entity. The Private access group includes only the space owner.

Each access condition in an access policy for a virtual container has at most one access group. By association then, each access mode in that access policy has at most one access group. When an access condition in a virtual container's access policy does not have an access group defined, the access condition defers to the next enclosing virtual container's access condition. All owner space virtual containers have immutable access groups of Private for all access conditions.

In the preferred embodiment, access groups are defined per owner space. Each defined access group is assigned an access group number. The predefined groups Public and Private might have access group numbers 1 and −1 respectively, leaving group number 0 to denote "Undefined". A virtual container's access policy may be encoded as a map, as depicted in FIG. 8. Items 801 through 806 represent the access conditions associated with each access mode. The map could be as simple as a sequence of group numbers, where the position of the group number denotes its access condition. For example, the first group number in the sequence might denote the Read access condition.

With the ability to control access to virtual containers comes the option to share those containers and their respective contents. When coupled with the virtual container and reference object method of the present invention, owners can create virtual containers that comprise reference objects that refer to objects in their own space, as well as in other owner spaces, assuming appropriate access permission. This capability in turn enables sharing and collaboration applications and services.

Virtual Container Structure

The structure of a virtual container is such that there are minimal traversals required for lookups and insertions. The method that provides this characteristic is a kind of recursive indexing made possible by the virtual container structure. A virtual container is created with a nominal capacity. By convention, the maximum capacity of a virtual container is about 30 times its nominal capacity. The preferred embodiment of the present invention uses predefined scale values at increments corresponding to orders of magnitude (power of 10). For example, a virtual container with a nominal capacity of 1000 items would have a scale order of magnitude of 3.

Virtual containers comprise one or more layers, the lowest of which comprises one or more cells. Cells are data structures themselves. In the preferred embodiment of the present invention, cells are hash tables. By convention, cells have a nominal capacity of 1,000 items and can grow as needed. Cells can grow effectively to about 30,000 items. It is also possible to resize entire virtual containers.

In the preferred embodiment, virtual containers with nominal capacities of 1000 or less have a single layer comprising a single cell. Larger scale virtual containers have more or larger layers and possibly more cells.

Each higher layer (i.e. all layers except the lowest) of a virtual container is an indexable structure. Indexable structures have very fast lookup times. It is common when dealing with indexable structures to create a structure in anticipation of the maximum capacity of that structure. The cost of resizing an indexable structure is quite high, and so resizes are typically avoided. This approach presents a serious scaling challenge. A single large indexable structure might require more computer memory than available.

Virtual containers do not rely on a single large indexable structure. Instead, they use multiple layers of indexable structures to achieve a very high scale. Conceptually, a virtual container is an indexable structure of indexable structures, nested as deeply as necessary to achieve a desired scale. FIG. 9 depicts a nest of indexable structures 9 layers deep, where Item 901 represents a top layer with 9 slots, and all other layers (represented by Items 902 through 909) have 10 slots each. At full capacity, the depicted structure would have a total of 1 Billion (10.0E09) slots. If the lowest layer slots each held a cell with a nominal capacity of 1,000 items, the nominal capacity of the whole structure would be 10 Billion items, with a maximum capacity in excess of 30 Billion items.

Assuming that the top-level indexable structure is a zero-based array, its indices would be 0 through 9. The structure in FIG. 9 has similar arrays at each layer. From a memory management perspective, one could instantiate the 10 slot top-level array and then populate the slots as needed. As memory is consumed, one could apply a paging-like method to move less frequently accessed subordinate arrays to disk.

There is a significant factor not yet resolved in this structure, and that is the nature and origin of the indices by which to index the array. Indices must be in range, and be reproducible.

Hash tables use a method by which an identifier or similarly unique-per-object value is transformed using a hash function, typically into an integer. That integer is then converted to an index, often using some kind of modulo remainder function. For example, if a hash code generated by a hash function were a signed 32 bit integer, and the number of slots in the table were 101, then the hash table's lookup method would take the modulo 101 remainder of that 32 bit integer and use the result as the index into the table. A large number of hash codes would result in the same modulo 101 remainder, so the hash table would create chains of the items that hashed to the same position. For best performance (and scaling), it is advantageous to limit the length of chains as much as possible.

The present invention exploits the phenomenon identified as Benford's Law, using a method described in U.S. Patent Application Publication No. 2010/0299333. Briefly, Benford's Law predicts, for a surprisingly wide range of data sets, that the values in the data set will be distributed in a predictable manner. The most common use of Benford's Law is in forensic accounting, using numbers in base 10. In base 10, Benford's Law predicts, for example, that the probability (and therefore the distribution) of the digit '1' in the leading digit position is about 30.1%. While to many Benford's Law seems counterintuitive, it has been proven formally and is in wide use. Table 1 lists the predicted distribution of leading digits, per Benford's Law.

TABLE 1

Digit Distribution per Benford's Law

| | | Digit Position | | | | |
|---|---|---|---|---|---|---|
| | | $1^{st}$ | $2^{nd}$ | $3^{rd}$ | $4^{th}$ | $5^{th}$ |
| Digit | 0 | 0.0000 | 11.9679 | 10.1784 | 10.0176 | 10.0018 |
| | 1 | 30.1030 | 11.3890 | 10.1376 | 10.0137 | 10.0014 |
| | 2 | 17.6091 | 10.8821 | 10.0972 | 10.0098 | 10.0010 |
| | 3 | 12.4939 | 10.4330 | 10.0573 | 10.0059 | 10.0006 |
| | 4 | 9.6910 | 10.0308 | 10.0178 | 10.0019 | 10.0002 |
| | 5 | 7.9181 | 9.6677 | 9.9788 | 9.9980 | 9.9998 |
| | 6 | 6.6947 | 9.3375 | 9.9401 | 9.9941 | 9.9994 |
| | 7 | 5.7992 | 9.0352 | 9.9019 | 9.9902 | 9.9990 |
| | 8 | 5.1153 | 8.7570 | 9.8641 | 9.9863 | 9.9986 |
| | 9 | 4.5757 | 8.4997 | 9.8267 | 9.9824 | 9.9982 |

The challenge with hash tables is distribution of hash codes. If a large number of collisions occur (when multiple items have the same hash code), long chains are required to hold those items and performance falls rapidly. The method described in U.S. Patent Application Publication No. 2010/0299333 transforms generated hash codes into predictably distributed values. That method is used to construct highly scalable virtual containers.

The top layer of a virtual container with a nominal capacity greater than 1,000 consists of a one-based array of 9 items. The array is called a digit group array because each slot in the array holds a reference to (address of) a digit group—a group of slots associated with a decimal digit. At the top layer, there are only 9 slots because '0' is not considered a valid leading digit. Lower layers use a zero-based array because the $2^{nd}$ and subsequent digits can be '0'.

Using the method described in U.S. Patent Application Publication No. 2010/0299333, the first digit of the hash code generated by a reference object's identifier (e.g. its URI) is used to index the top layer digit group array.

In the preferred embodiment, for a nominal capacity of 1 Million (10.0E06) items, a virtual container has a number of top-level slots (34 for example), apportioned amongst 9 digit groups. A virtual container uses the first digit of the hash code as an index into the 9 slots (e.g. a first digit of '3' corresponds to slot 3).

The 34 total slots in the example virtual container's top layer are arranged as depicted in FIG. 10. Item 1001 represents the digit group array. Benford's Law predicts a 30.1% distribution for '1' digits and so the virtual container allocates approximately 30.1% of 34, or 10 slots for items with hash codes having leading digits if '1' (Item 1002). As only whole slots can be allocated, the product of the predicted distribution percentage and the total count (34 in this case) must be rounded. Slot sizes for digits 2 through 9 are then 6, 4, 3, 3, 2, 2, 2, and 2 respectively.

To be able to use an indexable structure (versus a chain) in the digit groups, the method uses the second digit of the hash code to assign items to the slots in the digit groups in this example.

Benford's Law predicts, for the second digit, a different distribution; one that is slightly more uniform than for the leading digit (unlike the first digit, the second and higher digits can be '0'). In fact, as higher digit positions are considered, the predicted distribution rather quickly approaches uniform. While it is tempting to use this uniformity from the start, there are factors to consider. First is the number of digits available in the hash code. Another important factor is that the same digit cannot be used for more than one layer in a given virtual container. Doing so would result in the highest number of collisions. FIG. 11 depicts this phenomenon, in 2 alternate representations. The digits in the hash code represent a kind of path, and so all items, for a given hash code, in a given point in that path share the same elements of the path leading to that point (the higher-order digits in this case).

The distribution predicted for second digits from 0 through 9 is approximately 11.9679, 11.3890, 10.8821, 10.4330, 10.0308, 9.6677, 9.3375, 9.0352, 8.7570 and 8.4997, respectively. For the 34 total slots at a nominal capacity of 1M, only digit group 1 has at least 10 slots.

Due to rounding (and to avoid having any slots with 0 items), applying the predicted distribution across 10 slots yields 1 item per slot, and so the second digit of the hash is used directly as the index into digit group 1.

Digit group 2, at this scale, has only 6 slots and so some slots must hold items with more than one second digit. As listed in Table 2, the allocation of 10 second digits to only 6 slots places digit '0' in slot 0, digit '1' in slot 1 and 2 digits each in the remaining slots. This allocation intends to balance the effect of the predicted distribution of digits. Benford's Law says that there will be more values with second digits of '0' than with second digits of '1'; more with '1' than with '2', etc. As such, if the slots for the higher probability digits accept fewer of the digits, the allocation will be better balanced. Table 2 lists the other per-slot allocations used in the preferred embodiment for second and subsequent digit allocations when slot counts are smaller than 10.

TABLE 2

Digit Distribution in Smaller Sub-slots

| | Number of Slots | | | | | | | |
|---|---|---|---|---|---|---|---|---|
| | 2 | 3 | 4 | 5 | 6 | 7 | 8 | 9 |
| Digits | 0, 1, 2, 3, 4 | 0, 1, 2 | 0, 1 | 0, 1 | 0 | 0 | 0 | 0 |
| | 5, 6, 7, 8, 9 | 3, 4, 5 | 2, 3 | 2, 3 | 1 | 1 | 1 | 1 |
| | | 6, 7, 8, 9 | 4, 5, 6 | 4, 5 | 2, 3 | 2 | 2 | 2 |
| | | | 7, 8, 9 | 6, 7 | 4, 5 | 3 | 3 | 3 |
| | | | | 8, 9 | 6, 7 | 4, 5 | 4 | 4 |
| | | | | | 8, 9 | 6, 7 | 5 | 5 |
| | | | | | | 8, 9 | 6, 7 | 6 |
| | | | | | | | 8, 9 | 7 |
| | | | | | | | | 8, 9 |

At the example scale of 1M items, the second layer of the virtual container has a total of 50 slots, each containing a cell. The number 50 was chosen based on the predicted distribution of $3^{rd}$ digits, and on the desired scale, just as the number 34 was chosen based on the predicted distribution of $1^{st}$ digits.

As described earlier, a cell is a data structure: a simple hash table with a nominal capacity of 1,000 items in the preferred embodiment. The actual nominal capacity with this configuration then would be 34*50*1000, or 1,700,000 items.

Allocation amongst the 50 total slots in the lower layer is accomplished using the same method as for the top layer, but with different values and counts. Because the first and second digits were used at the top layer, they cannot be reused in the bottom layer. Instead, the lower layer begins with the $3^{rd}$ digit. Because the $3^{rd}$ digit can be '0', there are 10 digit groups at this layer, instead of the 9 digit groups at the top layer. Each of the 10 digit groups, based on the predictions by Benford's Law and the chosen total number of slots, has 5 slots.

The $4^{th}$ digit is used to allocate items to the 5 sub-slots in each digit group at the lower layer, with digits '0' and '1' in slot 0, '2' and '3' in slot 1, '4' and '5' in slot 2, '6' and '7' in slot 3, and '8' and '9' in slot 4.

The preferred embodiment of the present invention uses a relatively simple, but slightly specialized hash function (though the method in U.S. Patent Application Publication No. 2010/0299333 does not specifically require it). The hash function used creates a hash code in string form whose generated values have between 8 and 20 decimal digits. The wide range of magnitudes helps with the uniformity when transforming per Benford's Law, and the large number of digit positions supports multiple layers. Strings that result in hash codes of only 8 digits are themselves quite unusual, and if additional digit places are needed for these cases, the digit in that place would be assumed to be '0'.

As an illustration of the method, using the 1M item scale, take an item whose unique identifier is "The quick brown fox jumped over the lazy dog.". Applying to this identifier the hash function of the preferred embodiment of the present invention yields a hash code of 28160593400. Because its leading digit is '2', it would be assigned to digit group 2 at the top layer. Digit group 2 at the top layer has 6 slots. The hash code's $2^{nd}$ digit is '8' and so would be assigned to slot 4 in digit group 2 in the top layer (per Table 2).

The lower layer logic begins with the 3rd digit, in this case '1'. The item is assigned to digit group 1 in the lower layer. Digit group 1 has 5 slots of its own and so the 4th digit is used for allocation there. The 4th digit is '6' and so the item is assigned to the cell in slot 3. Assuming relatively even distribution amongst the digit groups (per the method in U.S. Patent Application Publication No. 2010/0299333, the cell in slot 3 would hold 1/(34*50) or 1/1700th of the 1M items. Even if that cell (a hash table) is not optimally efficient, it is dealing with less than 0.06% of the items in the virtual container. At larger scales the portion is even smaller.

A next example is a container with a nominal capacity of 1 B (10.0E09) items. At this scale, just as in the lower scale of the first example, there are 2 layers, the lower of which contains cells (conventional hash tables). To be able to support 3 orders of magnitude more items, each layer must be quite a bit larger than at the smaller scale. The nominal size of bottom layer cells is 1,000, the same as before. The top layer has, as before, a 9-slot digit group array. The top layer comprises 1531 total slots divided amongst the 9-digit group array slots resulting in digit groups with 461, 270, 191, 148, 121, 103, 89, 78, 70 slots for digits 1 through 9 respectively.

Following the same method as before, each digit group is indexed by the second digit in the hash code. Unlike in the previous example, the digit groups comprise more than 10 items each and so additional digits are needed to identify sub-slots within the digit groups. Table 3 shows the slot allocation for 1531 total slots in the top layer.

lating them on the fly, so there is ample opportunity for adjusting values as needed.

Because there are 24 slots resulting from the second indexing operation, and 24 is greater than 10, another step is needed. The slot at 2/8 holds a reference to an array of 24 items. This third array is indexed by the $3^{rd}$ digit of the hash code ('1' in the example). The predicted distribution (rounded) for 24 items per the $3^{rd}$ digit is 3, 3, 3, 3, 2, 2, 2, 2, 2, and 2 for digits 0 through 9, respectively (again for small numbers, rounding can be significant). As such, the number of slots available for digit '1' in the $3^{rd}$ position is 3. Because there is more than one slot, the next digit (digit position 4) is used to drive allocation of the items to those 3 slots. As described in Table 2, allocation for the 3 slots places items with a $4^{th}$ digit of '0', '1', or '2' into slot 0, items with a $4^{th}$ digit of '3', '4', or '5' into slot 2 and items with a $4^{th}$ digit of '6', '7', '8' or '9' in slot 3.

At this point all slots in the top layer of the virtual container are allocated and the method begins allocation in the lower layer. The lower layer at this scale (10.0E09 items) has 985 items. Because the 1,531 total slots required 4 digit positions to resolve, the lower tier allocation begins with the $5^{th}$ digit. At the $5^{th}$ and higher digit positions, the distributions are nearly uniform (a standard deviation of 0.001178), and so a uniform distribution is assumed. As such, the 1,000 total slots in the lower layer are divided evenly amongst digits 0 through 9, with 100 slots in each digit group. The 100 slots in each digit group are allocated by the next digit position (the $6^{th}$ digit), into groups of 10 each. Finally, the $7^{th}$ digit position is used to index into the lower-level slots to address the slot in which to find the cell in which the item with that hash code belongs.

TABLE 3

Allocation for 1531 Top Layer Slots

|  |  | Second Digit | | | | | | | | | | Totals | Var. |
|---|---|---|---|---|---|---|---|---|---|---|---|---|---|
|  |  | 0 | 1 | 2 | 3 | 4 | 5 | 6 | 7 | 8 | 9 |  |  |
| First | 1 | 55 | 53 | 50 | 48 | 46 | 45 | 43 | 42 | 40 | 39 | 461 | 0 |
| Digit | 2 | 32 | 31 | 29 | 28 | 27 | 26 | 25 | 24 | 24 | 23 | 269 | (1) |
|  | 3 | 23 | 22 | 21 | 20 | 19 | 18 | 18 | 17 | 17 | 16 | 191 | 0 |
|  | 4 | 18 | 17 | 16 | 15 | 15 | 14 | 14 | 13 | 13 | 13 | 148 | 0 |
|  | 5 | 14 | 14 | 13 | 13 | 12 | 12 | 11 | 11 | 11 | 10 | 121 | 0 |
|  | 6 | 12 | 12 | 11 | 11 | 10 | 10 | 10 | 9 | 9 | 9 | 103 | 0 |
|  | 7 | 11 | 10 | 10 | 9 | 9 | 9 | 8 | 8 | 8 | 8 | 90 | 1 |
|  | 8 | 9 | 9 | 8 | 8 | 8 | 8 | 7 | 7 | 7 | 7 | 78 | 0 |
|  | 9 | 8 | 8 | 8 | 7 | 7 | 7 | 7 | 6 | 6 | 6 | 70 | 0 |
| Totals |  | 182 | 176 | 166 | 159 | 153 | 149 | 143 | 137 | 135 | 131 | 1531 | 0 |

The rows are arranged by the first digit of the hash code. The columns are arranged by the second digit of the hash code. Using the example hash code of 28160593400, the first digit is '2' and the second digit is '8'. The predicted allocation for the '2' row was (as stated earlier) 270, but due to rounding, there are a total of 269 instead. It would appear that this is balanced by the allocation for row 7, as it has an extra slot allocated, but because the shortfall in row 2 is $1/270^{th}$ of the allocation for that row, and the overage in row 7 is $1/89^{th}$ of the allocation for that row, it is better to increase row 2 and decrease row 7 to their predicted values. The preferred embodiment predefines the actual values rather than calculating them on the fly, so there is ample opportunity for adjusting values as needed.

In the preferred embodiment, the nominal capacity of a virtual container with a top layer width (number of slots in the top layer) of 1531 and a lower layer width of 1000 is 1,531,000,000, assuming a nominal capacity per cell of 1,000 items. The maximum working capacity of such a container, assuming a maximum working capacity per cell of 30,000 items, would be 46 Billion (4.6E10) items.

Table 4 shows, for the preferred embodiment, the widths (total slots) of each layer, where layer 1 is a top layer. The lowest layer (right-most column in Table 4) always contains cells and not additional slots. Table 4 shows that for very small virtual containers, there is only a bottom layer, and that bottom layer has only 1 cell.

TABLE 4

Pre-defined Slot and Cell Sizes

| Nom Cap | Max Cap | Bits | Digit Groups per Layer | | | | | | | | | Cell Sizing | |
|---|---|---|---|---|---|---|---|---|---|---|---|---|---|
| | | | 1 | 2 | 3 | 4 | 5 | 6 | 7 | 8 | 9 | Bot | Cell Size |
| 1000 | 30,000 | 10 | 0 | | | | | | | | | 1 | 1,000 |
| 14,000 | 4.2E05 | 14 | 14 | | | | | | | | | 1 | 1,000 |
| 1.4E05 | 4.2E06 | 18 | 14 | | | | | | | | | 10 | 1,000 |
| 1.7E06 | 5.1E07 | 21 | 34 | | | | | | | | | 50 | 1,000 |
| 1.7E07 | 5.0E08 | 24 | 167 | | | | | | | | | 100 | 1,000 |
| 1.6E08 | 4.9E09 | 28 | 167 | | | | | | | | | 985 | 1,000 |
| 1.5E09 | 4.6E10 | 31 | 1531 | | | | | | | | | 1,000 | 1,000 |
| 1.5E10 | 4.6E11 | 34 | 1531 | 10 | | | | | | | | 1,000 | 1,000 |
| 1.5E11 | 4.6E12 | 38 | 1531 | 100 | | | | | | | | 1,000 | 1,000 |
| 1.5E12 | 4.6E13 | 41 | 1531 | 1,000 | | | | | | | | 1,000 | 1,000 |
| 1.5E13 | 4.6E14 | 44 | 1531 | 1,000 | 10 | | | | | | | 1,000 | 1,000 |
| 1.5E14 | 4.6E15 | 48 | 1531 | 1,000 | 100 | | | | | | | 1,000 | 1,000 |
| 1.5E15 | 4.6E16 | 51 | 1531 | 1,000 | 1,000 | | | | | | | 1,000 | 1,000 |
| 1.5E16 | 4.6E17 | 54 | 1531 | 1,000 | 1,000 | 10 | | | | | | 1,000 | 1,000 |
| 1.5E17 | 4.6E18 | 58 | 1531 | 1,000 | 1,000 | 100 | | | | | | 1,000 | 1,000 |
| 1.5E18 | 4.6E19 | 61 | 1531 | 1,000 | 1,000 | 1,000 | | | | | | 1,000 | 1,000 |
| 1.5E19 | 4.6E20 | 64 | 1531 | 1,000 | 1,000 | 1,000 | 10 | | | | | 1,000 | 1,000 |
| 1.5E20 | 4.6E21 | 68 | 1531 | 1,000 | 1,000 | 1,000 | 100 | | | | | 1,000 | 1,000 |
| 1.5E21 | 4.6E22 | 71 | 1531 | 1,000 | 1,000 | 1,000 | 1,000 | | | | | 1,000 | 1,000 |
| 1.5E22 | 4.6E23 | 74 | 1531 | 1,000 | 1,000 | 1,000 | 1,000 | 10 | | | | 1,000 | 1,000 |
| 1.5E23 | 4.6E24 | 78 | 1531 | 1,000 | 1,000 | 1,000 | 1,000 | 100 | | | | 1,000 | 1,000 |
| 1.5E24 | 4.6E25 | 81 | 1531 | 1,000 | 1,000 | 1,000 | 1,000 | 1,000 | | | | 1,000 | 1,000 |
| 1.5E25 | 4.6E26 | 84 | 1531 | 1,000 | 1,000 | 1,000 | 1,000 | 1,000 | 10 | | | 1,000 | 1,000 |
| 1.5E26 | 4.6E27 | 87 | 1531 | 1,000 | 1,000 | 1,000 | 1,000 | 1,000 | 100 | | | 1,000 | 1,000 |
| 1.5E27 | 4.6E28 | 91 | 1531 | 1,000 | 1,000 | 1,000 | 1,000 | 1,000 | 1,000 | | | 1,000 | 1,000 |
| 1.5E28 | 4.6E29 | 94 | 1531 | 1,000 | 1,000 | 1,000 | 1,000 | 1,000 | 1,000 | 10 | | 1,000 | 1,000 |
| 1.5E29 | 4.6E30 | 97 | 1531 | 1,000 | 1,000 | 1,000 | 1,000 | 1,000 | 1,000 | 100 | | 1,000 | 1,000 |
| 1.5E30 | 4.6E31 | 101 | 1531 | 1,000 | 1,000 | 1,000 | 1,000 | 1,000 | 1,000 | 1,000 | | 1,000 | 1,000 |
| 1.5E31 | 4.6E32 | 104 | 1531 | 1,000 | 1,000 | 1,000 | 1,000 | 1,000 | 1,000 | 1,000 | 10 | 1,000 | 1,000 |
| 1.5E32 | 4.6E33 | 107 | 1531 | 1,000 | 1,000 | 1,000 | 1,000 | 1,000 | 1,000 | 1,000 | 100 | 1,000 | 1,000 |
| 1.5E33 | 4.6E34 | 111 | 1531 | 1,000 | 1,000 | 1,000 | 1,000 | 1,000 | 1,000 | 1,000 | 1,000 | 1,000 | 1,000 |
| ... | | | | | | | | | | | | | | |
| 2.0E47 | 6.1E48 | 158 | 20001 | 20000 | 20000 | 20000 | 20000 | 20000 | 20000 | 20000 | 20000 | 20000 | 20000 |

The bottom row in Table 4 shows a configuration, in the preferred embodiment, with a total of 10 layers (including the bottom cell layer) with a nominal capacity of about 2 Thousand Quattuordecillion items (2.0E47). While a number that large would require an integer with 158 bits, it is important to note that the largest value of any index in a virtual container of that size is 20001, and that number fits easily into as few as 15 bits.

Note also that all array and cell sizes are small enough such that each could be represented in a file system as a directory, with the slots' and cells' items stored as files. This enables a simple and effective paging and caching mechanism.

The number of digits in the hash code needed to index all slots and sub-slots increases with the depth and breadth of layers. The 20-digit hash code in the example would be insufficient at nominal capacities above 1.0E22 (74 bits). A second hash function (generating a different digit sequence) could be used at that point, or for that matter at any point in the process. The actual hash function is a matter of implementation detail.

Efficiency

Efficiency of the virtual container mechanism, with respect to time and space, is very high. A large virtual container that is sparsely populated would have some overhead in terms of space. In the preferred embodiment, arrays that are populated with at least one item would be instantiated as directories on disk. Because the items in the arrays are, except for the items in the cells, not data per se, but are instead references to other tables, the actual space consumed is relatively low. In one experiment, a virtual container was created with a nominal capacity of 1 Billion (1.0E09) items, but populated with a single item (an object of about 100 bytes). The implementation used a conventional hash table for the bottom layer cell, with a nominal capacity of 1,000 items. The total space consumed on disk for that virtual container was about 16K, or 0.0016% of the nominal capacity of the container. In use, the overhead would vary with the distribution of items, but in all cases, the overhead is minimized.

More critically, the in-memory footprint of the virtual container can be quite small. Using the Billion-item virtual container of the previous example, and a single item with a hash code of 28160593400 as in earlier examples, the top layer of the virtual container would have 1531 total slots, and the bottom layer would have 1000 cells, each with a nominal capacity of 1000 items. To hold a single item (resident in one of the cells in the bottom layer), there would be in the top layer a 9-slot digit array populated with a single reference to another array of 270 slots itself populated with a single reference to an array of 24 slots populated with a single reference to an array of 3 slots populated with a single reference to a 10-slot digit array in the bottom layer. The 10-slot digit array in the bottom layer is populated with a single reference to an array of 100 slots, itself populated with a single reference to an array of 10 slots populated with a single reference to a cell that contains the reference to the actual data object (not the object itself). The actual data object can be instantiated in memory as needed, but its metadata would be present in the stored reference.

Efficiency with respect to time is also very high. The preferred embodiment includes pre-calculated table and slot sizes to eliminate the need for expensive distribution calculations. Each lookup requires creating a hash code using a relatively inexpensive hash function. The hash code's digits are used as indices into the various arrays until the desired cell is located. To access the cell, the whole hash code is used, effectively as another index, with modulo function. If there are no collisions in the cell itself, then there are no traversals at all involved in a lookup, regardless of the scale of the virtual container. Because there are many smaller hash tables at the bottom layer (e.g. 1.5 Million individual hash tables for a 1 Billion item nominal capacity), not only is the probability of collision very small (per the allocation method), but the number of items in each cell is kept small so that, even in the event of an extremely high collision rate in a cell, the length of a chain would be kept within a reasonable range.

Cost of item insertion is also very low for virtual containers. All arrays are populated as needed, and then with references to other arrays (or cells) only. The total cost of insertion (in memory) then is equivalent to the number of arrays involved times the cost of inserting in an array (index+put), plus the cost of insertion into the cell (close to the cost of insertion in an array). On collision within the cell, additional cost for insertion at the end of the chain would be added (assuming a linked structure, this is roughly equivalent to the cost of insertion in an array).

Cost of item deletion is low for virtual containers. Deletion incurs the cost of lookup, plus the cost of removing an item from a cell (very low). If any arrays become empty on item deletion, the array references could be deleted as well, to free memory resources if desired.

Sparse Population

The virtual container structure described has excellent scaling characteristics with respect to resource consumption, as described. For improved scaling with respect to operations in a distributed system, the virtual container apparatus has additional elements.

When an array in a layer of a virtual container is instantiated, each slot can have either a valid reference, or be empty. An empty slot would indicate that there is no object or table at that index. While this seems reasonable enough, it is scale-limiting because the contents of the slot must either be there or not exist at all. This implies that each replica of a virtual container must be as fully populated as each other replica, and in fact have fully identical contents. Virtual containers address this issue by maintaining bit maps representing the state of the various arrays and their slots. For example, in a top layer with 34 total slots, a virtual container would maintain a 34-position bit map, with each bit representing one of the 34 slots. When a slot is filled, the corresponding position in the bit map is set. These bit maps belong to the header portions of virtual containers, and are replicated with the container, and before any objects are replicated. As such, a node with an otherwise unpopulated virtual container can know definitively that a given slot should or should not have content (i.e. the bit position corresponding to the slot is set). If the node finds that a bit is set, but its corresponding slot is vacant, then it knows that it must load, from disk or from a peer, the contents of that slot. It also knows that if the bit is not set, then the slot should be empty, and that there is no reason to attempt to load its contents, and indeed there is no reason to look for it. This too can improve scaling because it eliminates an otherwise fruitless search.

The overhead associated with using a bit map to map an array's contents is approximately the inverse of the number of bytes that an element in a slot would occupy. In virtual containers, the elements in slots are references either to other arrays or to cells. A reference in the preferred embodiment is symbolic and can vary in length from a few bytes to hundreds of bytes. As such the overhead for using the bit map mechanism can vary from as much as 12.5% for a single byte reference (not likely, but permitted) to less than 0.4% for a 256 byte reference, to even less for a larger reference. The preferred embodiment uses a form of nested bit map (a map of maps) for larger arrays, where there is a bitmap of index ranges within the slots, to reduce even more the overhead for very sparsely populated containers.

In practice, the virtual container structure supports a progressive metadata model where a data object can be:
 1. Known not to exist,
 2. Possibly existent,
 3. Known to exist and therefore known about, or
 4. Present.

This in turn supports heterogeneously sparse population of virtual containers on different nodes. A given node, for example can have a virtual container with an entirely different partial population than another node's replica of that virtual container.

FIG. 12 depicts a simplified flow of logic for a method of progressively obtaining and acting upon object data and metadata. As described earlier in this document, the process begins with calculating the indices into the virtual container's tables (Item 1201). The diagram shows a single indexing operation, but for larger scale virtual containers, there can be several iterations of this step. If the slot is already occupied, then the process continues (Item 1203) to look in the cell associated with the lowest layer index. The preferred embodiment uses a cell that is a hash table, but also has a bit map to indicate presence or absence of items by index.

If a slot is empty, the method checks in the bit map the state of the bit corresponding to the empty slot (Item 1204). If the bit is not set, then the slot should be empty, and the search terminates (Item 1213). If the bit is set, then the method instantiates the slot contents (an array reference) and continues (Item 1203).

Once all of the upper layers of a virtual container have been searched or the process terminates, the method searches by index the bottom layer for the cell that would contain the item in question. If the cell is not in the slot, then the bit map is consulted. If the bit is unset, then the process terminates, as there is no such cell. If the bit is set, then the cell is read from either disk or a network peer.

With the cell available, the method queries the cell for the item's corresponding reference object. If the reference object does not exist, then the object itself does not exist and the process terminates. If the reference object does exist, then the method looks locally (on disk) for the data object to which the reference object refers. If the object does not exist locally, then it is obtained from a peer.

In the preferred embodiment a request for an object that is known to exist, but is not resident on the node receiving the request, can be redirected to a node on which the object is resident. A reference object that refers to a stored data object contains the object metadata including the location (node IDs) where each replica exists. This in turn can simplify the process of finding the actual object on a peer.

The present invention exploits a novel mechanism for hashed data structures, and a novel access control mechanism, The present invention comprises construction, organization and access control methods to provide a highly scalable and flexible data storage system well suited but not limited to multimedia objects. Additionally, the present invention includes methods to support sparse data structure population and caching or paging to conserve computer system resources and to support larger scale data sets. A wide range of applications and services can be enabled by the present invention including but not limited to multimedia storage, personalized data storage, sharing and collaboration, vaulting and archiving.

Embodiments provide for various methods and apparatus for providing virtual data storage. For instance, a first example apparatus comprises a logical data storage apparatus comprising: a physical storage layer comprising data storage containers such as magnetic or optical disks, LUNs, and RAID groups; a logical storage layer comprising logical data storage containers such as file systems, folders and directories; a virtual storage layer comprising virtual containers, wherein said virtual containers are complex data structures and, wherein said virtual containers may contain a plurality of logical references to stored logical objects and, wherein logical objects referenced in said virtual containers may be stored in one or more logical containers.

A second example apparatus comprises the first example apparatus, wherein a virtual container may exist as a whole or in part on one or more than one physical computer systems and, wherein the totality of parts constitutes at least the full contents of said virtual container. A third example apparatus comprises the first example apparatus wherein an object stored in a virtual container may exist in whole or in part in one or more instances of said virtual container. A fourth example apparatus comprises the first example apparatus wherein different instances (replicas) of the same object or the same container may be implemented differently on different storage nodes or in different logical containers. A fifth example apparatus comprises the first example apparatus wherein different instances (replicas) of the same object or the same container may be populated to different extents on different storage nodes or in different logical containers. A sixth example apparatus comprises the first example apparatus, wherein an arrangement of virtual containers may be configured in such a manner as to appear to have an organizational structure such as a hierarchy or tree, a chain, a list, or a table. A seventh example apparatus comprises the first example apparatus, wherein ownership of a container implies ownership of stored objects contained within said container. An eighth example apparatus comprises the seventh example apparatus, wherein access to stored objects may be restricted to exclude client access other than via references in virtual containers. A ninth example apparatus comprises the seventh example apparatus, wherein the owner of a container may assign access rights to others. A tenth example apparatus comprises the seventh example apparatus, wherein the owner of a container may assign access rights to others and, wherein said access rights may be further constrained by policies of a second container that logically encloses the first container.

An eleventh example apparatus comprises the first example apparatus, wherein logical references in a container at the virtual storage layer may refer to objects stored in more than one logical container such as a file system, at the logical storage layer. A twelfth example apparatus comprises the first example apparatus, wherein some objects, including but not limited to large objects, may be subdivided into multiple elements and, wherein each element may be stored independently and, wherein a client may refer to the separate parts or to the original object as a unit. A thirteenth example apparatus comprises the first example apparatus, wherein a container may hold references to related objects, wherein said objects are of various and possibly dissimilar types or forms, such as text files, data files, audio files, videos, executable programs or virtual machine images and, wherein said container may represent a complex object and, wherein said object, a virtual container, may have a single identifier such as a URI by which clients may access it as a whole or access its constituent objects. A fourteenth example apparatus comprises the first example apparatus, wherein virtual containers may comprise: multiple levels of indexable structures and associated mapping structures such as bitmaps, wherein the lowest or final level of structures may contain, at each index position, an instance of or reference to a conventional data structure such as a hash table, wherein said conventional data structure may contain references to or instances of stored objects and, wherein the levels other than the lowest or final level are indexed according to a sequence of indices generated for that purpose from a unique identifier representing a stored object.

A first example method comprises a method as applied to the first example apparatus, wherein a single hashing operation on an object's unique identifier may yield a hash key comprising a sequence of digits wherein each digit may be used as an index into a structure at an associated. A second example method comprises the first example method, wherein the maximum index value at any level does not exceed that which can be stored electronically in 16 bits (2 bytes). A third example method comprises the first example method, wherein the maximum number of items at any layer other than the lowest or final layer does not exceed the maximum number of entries that can be stored in a directory or folder of a typical conventional file system such as NTFS, ext3.

A fourth example method comprises a method as applied to the first example apparatus, wherein the information describing the object, versus data contained within the object itself ("object metadata"), may be arranged such that a storage node may know the state of an object, with respect to presence and existence as follows: known to not exist or, known possibly to exist or, known certainly to exist or, present in the storage node's addressable space. A fifth example method comprises the fourth example method, wherein a storage node, having knowledge of the existence, non-existence or presence of an object may apply that knowledge such that said storage node may: terminate a search for said object if said object is known to not exist or, defer a search for said object if said object is known possibly or certainly to exist but is known not to be present or, continue a search for said object if said object is known to be present. A sixth example method comprises the fourth example method, wherein instances or replicas of a given virtual container may contain similar or dissimilar subsets of said virtual container's contents and wherein a storage node having an instance of said virtual container.

What is claimed is:
1. A virtual data storage system comprising:
at least one computing device operative to execute a virtual storage application, the virtual storage application configured to:
generate at least one virtual storage layer in operable communication with at least one logical storage layer configured to logically store a plurality of data objects within at least one logical storage container, the logical storage layer being in operable communication with at least one physical storage layer configured to physically store the plurality of data objects;
generate a plurality of virtual containers within the at least one virtual storage layer;
store at least one object reference in at least one of the plurality of virtual containers, the at least one object reference configured to reference at least one of the plurality of data objects; and
provide access to at least one of the plurality of data objects responsive to access of the at least one object reference, wherein access to the at least one object reference is based on an access policy of a virtual container storing the at least one object reference.

2. The virtual data storage system of claim 1, wherein the at least one object reference comprises one object reference configured to reference a plurality of data objects.

3. The virtual data storage system of claim 2, wherein the plurality of data objects comprises a plurality of elements associated with at least one multi-element object.

4. The virtual data storage system of claim 3, wherein the at least one multi-element object comprises a multimedia file and wherein the plurality of data objects comprise at least one of the following multimedia file elements: an audio file, a video file, an image file, and a text file.

5. The virtual data storage system of claim 1, wherein the plurality of virtual containers comprises at least one container layer.

6. The virtual data storage system of claim 5, wherein the at least one container layer comprises a lowest layer and a plurality of higher layers and wherein the lowest layer comprises at least one cell comprising a hash table.

7. The virtual data storage system of claim 1, wherein the at least one computing device comprises a plurality of computing devices and the plurality of virtual containers are stored across the plurality of computing devices.

8. The virtual data storage system of claim 1, wherein the at least one reference is accessed using a uniform resource identifier.

9. A computer-implemented method for providing virtual data storage, the method comprising:
   generating at least one virtual storage layer stored on at least one computing device, the at least one virtual storage layer being in operable communication with at least one logical storage layer configured to logically store a plurality of data objects within at least one logical storage container, the logical storage layer being in operable communication with at least one physical storage layer configured to physically store the plurality of data objects;
   generating a plurality of virtual containers within the at least one virtual storage layer;
   storing at least one object reference in at least one of the plurality of virtual containers;
   referencing at least one of the plurality of data objects through the at least one object reference; and
   providing access to at least one of the plurality of data objects responsive to access of the at least one object reference, wherein access to the at least one object reference is based on an access policy of a virtual container storing the at least one object reference.

10. The computer-implemented method claim 9, wherein the at least one computing device comprises a plurality of computing devices and arranging the plurality of virtual containers within the at least one virtual storage layer comprises storing the plurality of virtual containers across the plurality of computing devices.

11. The computer-implemented method of claim 9, wherein providing access to the plurality of data objects comprises providing access to the plurality of data objects using a uniform resource identifier.

12. The computer-implemented method of claim 9, further comprising obtaining information describing the plurality of data objects.

13. The computer-implemented method of claim 12, wherein the information describing the plurality of data objects comprises metadata.

14. The computer-implemented method of claim 12, wherein the information describing the plurality of data objects comprises a state of at least one of the plurality of data objects.

15. The computer-implemented method of claim 14, wherein the state comprises at least one of the following: a data object is known to exist state, a data object is known to possibly exist state, a data object is not known to exist state, and a data object is known to exist state.

16. The computer-implemented method of claim 15, further comprising:
   receiving, at the at least one computing device, a request to perform a search associated with at least one data object;
   checking the state of the at least one data object; and
   processing the request based on the state of the at least one data object.

17. The computer-implemented method of claim 16, wherein processing the search request comprises terminating the search responsive to the state of the at least one data object comprising the data object is not known to exist state.

18. The computer-implemented method of claim 16, wherein processing the search request comprises deferring the search responsive to the state of the at least one data object comprising the data object is known to possibly exist state.

19. The computer-implemented method of claim 16, wherein processing the search request comprises performing the search responsive to the state of the at least one data object comprising the data object is known to exist state.

20. The computer-implemented method of claim 9, further comprising controlling access to the plurality of virtual containers using a per-container access policy comprising at least one access condition and at least one access mode.

* * * * *